US008610827B2

(12) United States Patent
Vantalon et al.

(10) Patent No.: US 8,610,827 B2
(45) Date of Patent: Dec. 17, 2013

(54) DIRECT IPTV DISTRIBUTION

(75) Inventors: Luc Vantalon, Sunnyvale, CA (US); Paolo Siccardo, Los Altos, CA (US)

(73) Assignee: Digital Keystone, Inc., Mountain View, CA (US)

( * ) Notice: Subject to any disclaimer, the term of this patent is extended or adjusted under 35 U.S.C. 154(b) by 980 days.

(21) Appl. No.: 12/422,873

(22) Filed: Apr. 13, 2009

(65) Prior Publication Data

US 2010/0259678 A1  Oct. 14, 2010

(51) Int. Cl.
 *H04N 7/167* (2011.01)
 *H04N 7/00* (2011.01)
 *H04N 11/00* (2006.01)

(52) U.S. Cl.
 USPC ............ 348/552; 380/210; 380/211; 725/110

(58) Field of Classification Search
 USPC .......... 348/552–570, 725–733; 725/100–103, 725/133; 380/200, 211, 255, 210, 239–242; 713/171
 See application file for complete search history.

(56) References Cited

U.S. PATENT DOCUMENTS

| | | | |
|---|---|---|---|
| 7,711,954 B2 | 5/2010 | Vantalon et al. | |
| 8,200,985 B2 * | 6/2012 | Dellow | 713/189 |
| 2002/0196939 A1 * | 12/2002 | Unger et al. | 380/216 |
| 2003/0026423 A1 * | 2/2003 | Unger et al. | 380/217 |
| 2003/0046686 A1 * | 3/2003 | Candelore et al. | 725/31 |
| 2003/0081776 A1 * | 5/2003 | Candelore | 380/200 |
| 2003/0135730 A1 * | 7/2003 | Szucs et al. | 713/153 |
| 2004/0221302 A1 | 11/2004 | Ansari et al. | |
| 2005/0169473 A1 * | 8/2005 | Candelore | 380/239 |
| 2005/0182931 A1 * | 8/2005 | Robert et al. | 713/168 |
| 2008/0120675 A1 | 5/2008 | Morad et al. | |
| 2008/0127259 A1 * | 5/2008 | Hong et al. | 725/39 |
| 2008/0292103 A1 * | 11/2008 | Lee et al. | 380/277 |

FOREIGN PATENT DOCUMENTS

| | | |
|---|---|---|
| WO | WO-01/80473 | 10/2001 |
| WO | WO-2004/112385 | 12/2004 |
| WO | WO-2007/072211 | 6/2007 |

OTHER PUBLICATIONS

PCT International Preliminary Report on Patentability for International Application No. PCT/US2010/030426, mailed Oct. 18, 2011, 9 pages.
PCT International Search Report and Written Opinion for PCT/US2010/030426 mailed Aug. 19, 2010, 15 pages.

* cited by examiner

*Primary Examiner* — Michael Lee
(74) *Attorney, Agent, or Firm* — Blakely, Sokoloff, Taylor & Zafman LLP

(57) ABSTRACT

The invention defines a method for leveraging the standard conditional access module interface of a digital TV receiver to deliver IPTV or other TV content without the need of a set top box. An IP-connected interface ("probe") is used in place of a conditional access module to establish a two-way communication link between the TV and the IPTV headend or other IP content source and to deliver IP content. In an embodiment, the invention covers the specifics of content navigation without requiring any modification of the TV receiver application software or provisioning of IPTV-specific software. Content navigation is achieved by supporting a catalog/grid browsing session on the TV receiver and enabling a flat multiplex navigation, a virtual MPEG multiplex that contains the definition of several available programs but a single video and audio channel is dynamically switched to carry the selected program.

8 Claims, 21 Drawing Sheets

| Encrypting, outside of a probe in the CAM interface, the TV content with the DRM encryption 45 |
|---|
| Transmitting the DRM-encrypted TV content to the probe, wherein the TV content from the probe is sent to the TV receiver without changing the DRM encryption 46 |

Channel Map

| Logical Channel | Frequency | Program Number | A/V PID |
|---|---|---|---|
| Channel 1 | Frequency 1 | Program 1 | 10/11 |
| Channel 2 | Frequency 1 | Program 2 | 20/21 |
| Channel 3 | Frequency 1 | Program 3 | 30/31 |
| Channel 4 | Frequency 2 | Program 1 | 10/11 |
| Channel 5 | Frequency 2 | Program 2 | 20/21 |
| Channel 6 | Frequency 2 | Program 3 | 30/31 |
| . | . | . | . |
| . | . | . | . |
| . | . | . | . |
| Channel n | Frequency p | Program 1 | 10/11 |
| Channel n+1 | Frequency p | Program 2 | 20/21 |
| Channel n+2 | Frequency p | Program 3 | 30/31 |

Fig. 10
(Prior art)

Channel Map

| Logical Channel | Frequency | Program Number | A/V PID |
|---|---|---|---|
| Channel 1 | Frequency 1 | Program 1 | 10/11 |
| Channel 2 | Frequency 1 | Program 2 | 10/11 |
| Channel 3 | Frequency 1 | Program 3 | 10/11 |
| Channel 4 | Frequency 1 | Program 4 | 10/11 |
| Channel 5 | Frequency 1 | Program 5 | 10/11 |
| Channel 6 | Frequency 1 | Program 6 | 10/11 |
| . | . | . | . |
| . | . | . | . |
| . | . | . | . |
| Channel n | Frequency 1 | Program n | 10/11 |
| Channel n+1 | Frequency 1 | Program n+1 | 10/11 |
| Channel n+2 | Frequency 1 | Program n+2 | 10/11 |

Fig. 12

DIRECT IPTV DISTRIBUTION

BACKGROUND OF THE INVENTION

1. Field of the Invention

The present invention relates to the direct distribution of pay TV content, and particularly relates to methods and apparatuses to establish a two-way communication link between a broadcast TV set and an IPTV server.

2. Background

Digital television sets are typically designed to display free-to-air digital content broadcasted over cable or terrestrial networks. The digital broadcast signals include multiple channels modulated at different RF frequencies, which are distributed within a frequency range. Each RF channel carries multiple programs, such as video, audio, and other data, multiplexed together in a MPEG transport stream. The digital television set expects some standardized program information data to be available within one or more transport stream to create a global channel map.

When connected to pay TV services, a set-top box is typically added in front of the digital television set for receiving the transmission, selecting a channel and decrypting the signal. The set-top box thus provides a navigation function for selecting a channel within the received signal. The set-top box can also provide a security function for decrypting the received signal. For example, the set-top box can be a part of a conditional access (CA) system for verifying the entitlements of the subscriber before removing the encryption.

Alternatively, modern HDTV (High Definition Television) receivers can have an interface to plug a renewable Conditional Access Module (CAM), capable of removing the conditional access encryption based on the subscription level and to re-encrypt for a locally secured transmission back to the HDTV. Such an architecture based on open standards, as for example the DVB Common Interface standard with the CI+ extension in Europe, or the OpenCable standard in North America, allows for the design of truly generic television sets that work with different CAMs, which can be selectively attached and detached. The generic HDTV receiver includes one or more RF tuners, one or more CAM interfaces and the right resources for decoding, rendering the content, but also optionally for content storage and/or export. The CAM interface is positioned in between the receiving function (RF Tuner) and the processing function (decoder, recorder, rendered, exporter) of the HDTV receiver. The HDTV receivers must support the standardized DRM system of the CAM so it can cryptographically pair with the CAM and descrambled the content returned by the CAM.

Further and depending on the HDTV receiver implementation, there could be one CAM per RF tuner or one for multiple RF tuners. The CAM has the ability to generate subscription and diagnostics messages that will be presented to the user by the HDTV.

In addition, IPTV (Internet Protocol Television) can provide an alternative digital broadband distribution of the same video and data. Usually HDTV receivers don't support these services, as it required a two-way communication path with the IPTV server, combined with network specific navigation, streaming and security protocols.

SUMMARY OF THE DESCRIPTION

The present invention pertains, in general, to methods and apparatuses for leveraging the standard conditional access module (CAM) interface of a HDTV receiver to deliver IPTV and other TV and IP content without the need of a set top box.

According to an embodiment, systems and methods are provided for fully supporting IPTV (Internet Protocol TV) service access without the need of implementing any modification to the HDTV receiver hardware or software. According to another embodiment, methods and apparatuses are provided for simplifying the RF channel navigation capabilities of a standard HDTV receiver, reducing the cost of equipment, subscriber acquisition and operation. Some embodiments provide methods and apparatuses for managing digital rights using the inherent DRM system of the HDTV receiver. Some embodiments of the present invention also provide systems, methods, and apparatuses for conditioning the HDTV receiver in accepting a removable probe, which behaves as CAM from the HDTV receiver side and as a regular IPTV set-top box from the IPTV server side. Embodiments of the present invention may simplify digital media content delivery, conditional access, and digital rights management and provide for the ability to employ a standard HDTV receiver for direct IPTV distribution without modification.

In an embodiment, the IPTV content is protected from the IPTV server to the probe using a private conditional access system and then from the probe to the HDTV receiver using the inherent DRM encryption of the HDTV. This embodiment requires the probe to be capable of transcrambling the content. This converting may be referred to as a "security bridging". In another embodiment, the IPTV content is directly encrypted by the IPTV server with the inherent DRM encryption of the HDTV, which removes the need for bridging within the probe module.

In an embodiment, the present invention discloses a probe for replacing a removable CAM in a compliant HDTV receiver, and methods and apparatuses for inserting the probe in the place of the removable CAM. The present probe can allow the delivering of IPTV or other IP content without the need for a set top box by establishing a two-way communication link between the TV and the IP source, such as an IPTV headend, or other IP content source delivering IP content. In an aspect, the probe comprises a CAM interface for communicating with the HDTV receiver, and an IP interface for communicating with an IP source.

Recognizing that certain HDTV receivers may require detecting a valid RF signal before requesting the inserted CAM module to descramble a particular channel, the present probe can optionally comprise a RF module that can generate a synthesized RF signal for the purpose of putting the HDTV RF tuner in a lock state compatible with the activation of the CAM interface. The synthesized RF signal can be an empty RF signal, designed to just lock the RF tuner. For example, the synthesized RF signal can be a test or a logo pattern, or just a blank, monochromatic image (e.g., a totally black screen). Alternatively, the synthesized RF signal can be specially designed to address the specific of the HDTV receiver navigation requirements, such as information regarding the available channels or the necessary program information tables required by the HDTV TV receiver to create a channel map. After being tasked by the HDTV receiver, the probe can transmit the TV content through the CAM interface, or through the RF tuner. The TV content can be added to the RF signal in a way that makes the TV receiver capable of rendering the content without any modification to its hardware and software. The modulated RF signal is then sent back to the probe. The probe can act as a pass through if the content has been already scrambled by the TV source according to the embedded or inherent DRM system of the TV receiver, or as a bridge where the signal is descrambled and re-encrypted with a different encryption.

In an embodiment, the probe is able to up-convert the synthesized RF signal to any frequency in the range of the RF tuner of the HDTV. In an aspect, the synthesized RF signal is limited to one or two predetermined frequencies (for example channel 3 and 4 like a VCR). The HDTV receiver is expected to find the probe signal during its standard setup operation in order to parse the navigation information that it carries. In cases that the RF tuner can accept channel switching commands from the CAM interface, for example, according to the OpenCable standard, the probe can expedite the setup process by directly forcing the RF tuner to lock on the right frequency. The probe can also comprise a circuitry to tune the RF tuner to a predetermined frequency, for example, through the RF tuner control command of the CAM interface.

In an embodiment, the probe converts the IPTV server channel map into standardized tables that can be parsed by the HDTV receiver to create a detailed channel map. In one aspect, the navigation tables are included into the RF synthesized signal. In another aspect, the navigation tables are inserted by the probe into the transport stream when it transits through as a baseband signal, or it can be delivered out-of-band by the probe to the HDTV receiver using the communication protocol of the CAM interface.

In an embodiment, the probe can use the man-machine interface capability of the CAM interface to create an IPTV content browsing experience. In an aspect, the HDTV can simply do a channel change operation based on the channel map information. In both cases, when the probe is notified about the program that the user has requested, it makes a request to the IPTV server for that program. The program is then channeled back to probe where it is added to the synthesized RF signal for the TV receiver to pick-up. Depending on the encryption mode, the content may be bridged (decrypted and re-encrypted) in the probe or passed-through.

In an embodiment, the probe provides a set of program information tables that virtually position all possible programs available from the IPTV source into a "Flat Multiplex" on a single frequency. In an aspect, the Flat Multiplex is a transport stream, such as a MPEG2-compliant transport stream, that includes virtually all the available channels of the TV source, but physically only carries the audio and video components of the user-requested program. In an aspect, the present Flat Multiplex transport stream is a single elementary program stream that carries the audio and video of the selected program. For example, on a DVB system, the Flat Multiplex can include system information tables, such as the Network Information Table (NIT) and the Service Description Table (SDT) that will describe a single transport stream on a fixed frequency for all the services of the network, such as programs or channels. In addition, in the Flat Multiplex program information table, the Program Association Table (PAT) enumerates the Program Map Table (PMT) of all the virtual channels that can be delivered, with each PMT points to the same reference audio and video component. The present probe thus can be simplified with circuitry for one single frequency with an audio/video switching module to match the audio/video components of the desired incoming IP program. In operation, the TV is requested to tune to the single frequency and then, before desired content is received on that single frequency, a request for a channel is sent to an external source (e.g. an IPTV source) which can then provide the desired content. The probe can be further simplified with only one static RF up-converter.

Therefore, as summarized herein, the present invention provides, among other things, methods for transmitting IPTV content to a HDTV receiver using a probe interfacing with the HDTV receiver through a conditional access module interface built into the HDTV. The probe allows streaming IPTV content to a TV that may not support it. Furthermore, some embodiments of the present invention allow for a direct IPTV distribution with simplified equipment through a flat multiplex content navigation. Content navigation and content authorization are supported without requiring any modification of the TV receiver hardware, application software, or provisioning of IPTV-specific software and IPTV-specific Conditional Access software. These and other embodiments, features, aspects, and advantages of the present invention will be apparent from the accompanying drawings and from the detailed description and appended claims that follow.

BRIEF DESCRIPTION OF THE DRAWINGS

FIG. 10 illustrates a prior art channel map.

FIG. 12 illustrates an exemplary channel map for the present Flat Multiplex.

DETAILED DESCRIPTION OF THE PREFERRED EMBODIMENTS

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

At least an embodiment of the present invention seeks to distribute the TV content from a TV source to a number of TV sets through an IP (Internet Protocol) network. The TV source can be an IP content source, such as an IPTV headend or other PayTV headend, and typically comprises a Content server. Further included are a Navigation server to provide a content catalog/grid and an Authorization server to secure access of the TV content. In an aspect, the present invention provides a probe, together with methods and apparatuses to enable direct IPTV distribution from an IPTV headend. It will be understood that the term "IP" is intended to refer to any network protocol, including the Internet Protocol.

Figure 1:
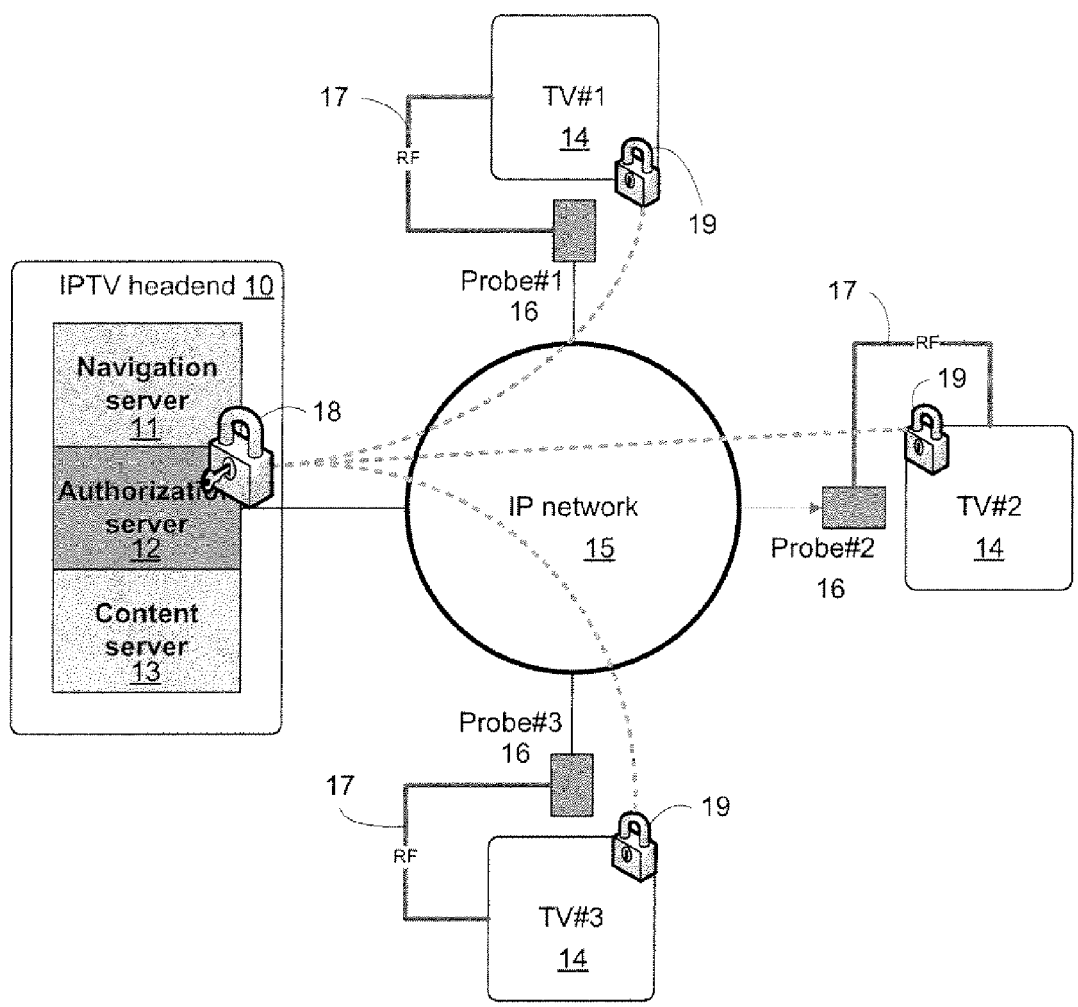
FIG. 1 shows an exemplary schematic of a direct IPTV distribution according to an embodiment of the present invention.

FIG. 1 illustrates an exemplary schematic of a direct IPTV distribution according to an embodiment of the present invention. An IPTV headend 10 comprising a Navigation server (or Catalog server) 11, an Authorization server (a CA server or a DRM server) 12 and a Content server 13 is distributed over an IP network 15 to multiple TV sets 14 (TV #1-TV #3 shown) through probes 16, which provides communication between the TV sets 14 and the IPTV headend 10. The probe 16 can have a RF connection 17 to transmit signal to the TV set 14. Details of the probe will be elaborated in later sections. The TV content distributed from the IPTV headend can be encrypted, for example, by the DRM encryption of the TV 18. At the TV set 14, the scrambled content can be descrambled 19 for viewing with appropriate authorization. The authorization can be securely transmitted by the IPTV server 10 through the probe 16, using the native pairing and key exchange methods of the DRM.

Figure 2:
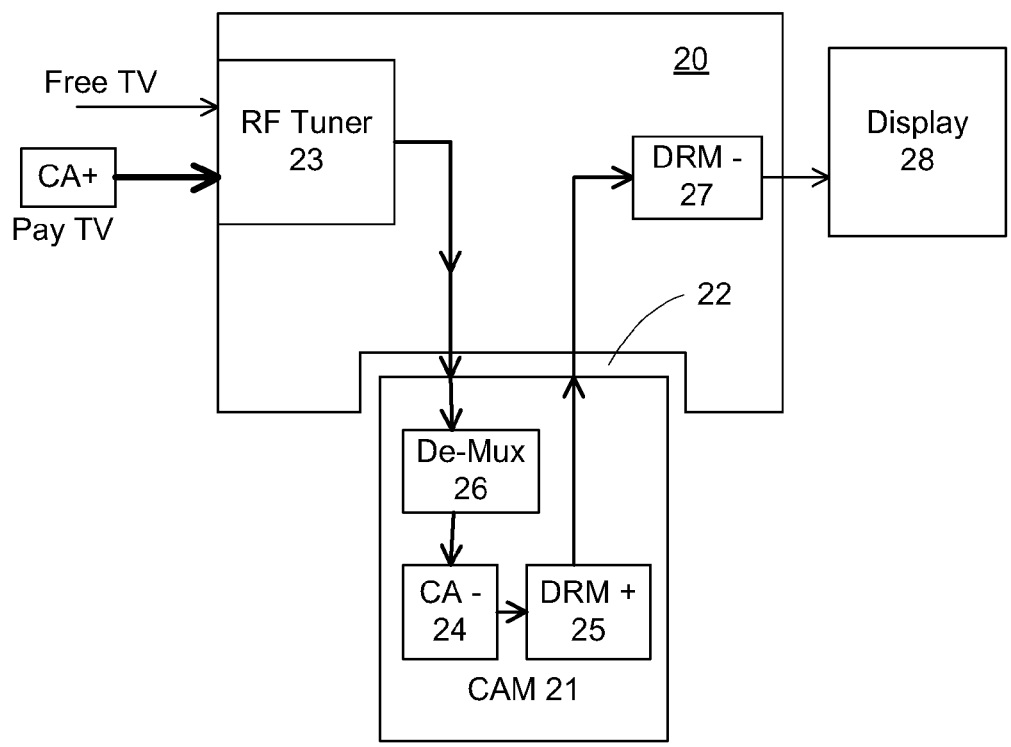
FIG. 2 shows a block diagram representation of a TV receiver equipped with a prior art conditional access module.

FIG. 2 illustrates schematically a digital television receiver 20 and its connections to a prior art conditional access module (CAM) 21 through a CAM interface 22. The CAM interface 22 has a standard form of a PCMCIA (or PC card) slot to host a removable CAM. The CAM interface 22 also has two logical interfaces sharing the same physical interface, to transfer control and status information and to carry back and forth a transport stream between the TV receiver 20 and the CAM 21. The transport stream originates from the RF tuner 23 of the TV receiver 20, after tuning to the carrying frequency and demodulating the digital signal. The transport stream consists of multiple programs, time multiplexed together. Each program can be unscrambled, e.g. from a Free TV source, or scrambled, e.g., from a Pay TV source, encrypted with a CA encryption. The program information data available in the transport stream can be used by the TV receiver 20 to identify which audio and video components need to be descrambled by the CAM. The CAM starts by removing the CA encryption 24, and then re-encrypted the cleared audio and video components with the DRM encryption 25 inherent or native to the TV receiver. This DRM encryption is to ensure that the TV content is protected across the interface 22. After reaching the TV receiver, the program is DRM descrambled 27 before being sent to the display 28.

A demultiplexer 26 is also included to isolate from the multiple programs of the transport stream, the audio and video components that need to be descrambled and re-scrambled. There can be additional demultiplexers in the TV receiver.

As shown in FIG. 2, modern HDTV (High Definition Television) receivers include a CAM interface designed to receive a CAM which bridges an external CA-encrypted signal to the inherent or native DRM in the HDTV. The HDTV is equipped with circuitry within the HDTV to decrypt this inherent DRM, for example, the TV receivers could be configured so that information for authentication and for secure communication is individually loaded into each of the TV receivers (e.g., typically when the product is being produced at some stage of a manufacturing process). The information for establishing a secure authenticated channel includes information for uniquely identifying each of the products.

In an embodiment, the present invention covers the authorization and de-authorization of premium content access for each TV set, without requiring the provisioning of IPTV-specific CA software in the TV receiver. Premium content access is enabled by leveraging a content protection scheme inherent to the TV receiver to establish a unique secure authenticated channel directly between the IPTV server and each TV receiver to deliver content keys only to an authorized TV receiver. In an embodiment, the present invention applies the inherent Digital Rights Management (DRM) encryption of the TV (in modern HDTVs) to the TV content in the probe after removing the CA encryption of the content applied by the TV source. In an embodiment, the TV content is encrypted by the TV source directly with the inherent DRM encryption of the TV set. In this embodiment, there is no need for a bridging circuitry in the probe, for example, to convert from a CA protection to a DRM protection, and hence without any CA decryption and without any DRM encryption circuitries.

Figures 3A, 3B:
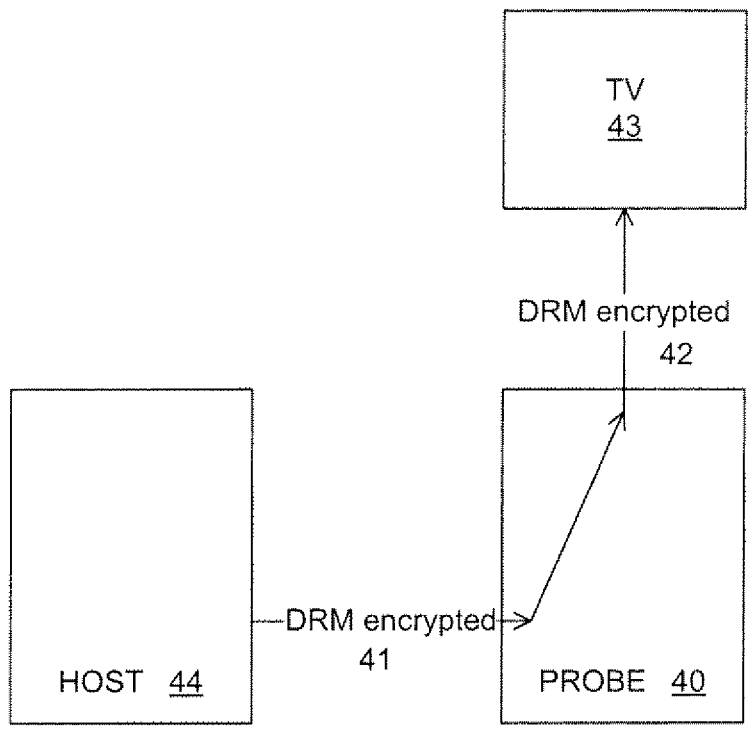
FIG. 3A illustrates an exemplary schematic of the present probe, which is a removable access module for a TV receiver.
FIG. 3B illustrates an exemplary process for simplifying the secure transmission of a TV content with the inherent DRM encryption.

FIG. 3A illustrates an exemplary schematic of a DRM-transmission probe 40, which is a removable access module for a TV receiver 43 for transmitting signals from a host server 44 to the TV receiver 43. In an aspect, the probe is designed to replace the standard CAM, and has a CAM interface for connection with the TV set. Through the CAM interface, the probe receives a transport stream 41, for example, from the host server 44, carrying a program that has been encrypted with the inherent DRM encryption of the TV receiver 43. The transport stream 41 passes through the probe 40, and reaches the TV receiver 43 without modifying the encryption 42. The output transport stream 42 from the probe still carries the DRM encryption that has been applied to the program outside the probe. The present encryption of TV content with the inherent DRM encryption of the TV receiver can simplify the design and fabrication of the probe, since the encrypted signal can simply pass through the probe without any decryption or re-encryption process.

FIG. 3B illustrates an exemplary process for simplifying the secure transmission of a TV content with the inherent DRM encryption. Operation 45 encrypts the TV content with the inherent DRM encryption outside the probe in a CAM interface for connecting the TV receiver. In an aspect, the probe can replace the standard CAM in leveraging the present invention. Operation 46 transmits the DRM-encrypted TV content to the probe, and wherein the TV content is then sent to the TV receiver without changing the DRM encryption. The TV content can be descrambled at the TV receiver, which has been fabricated with a DRM decryption module. The present transmission process is secure since the TV content is protected throughout the transmission with the DRM encryption.

Figure 4:
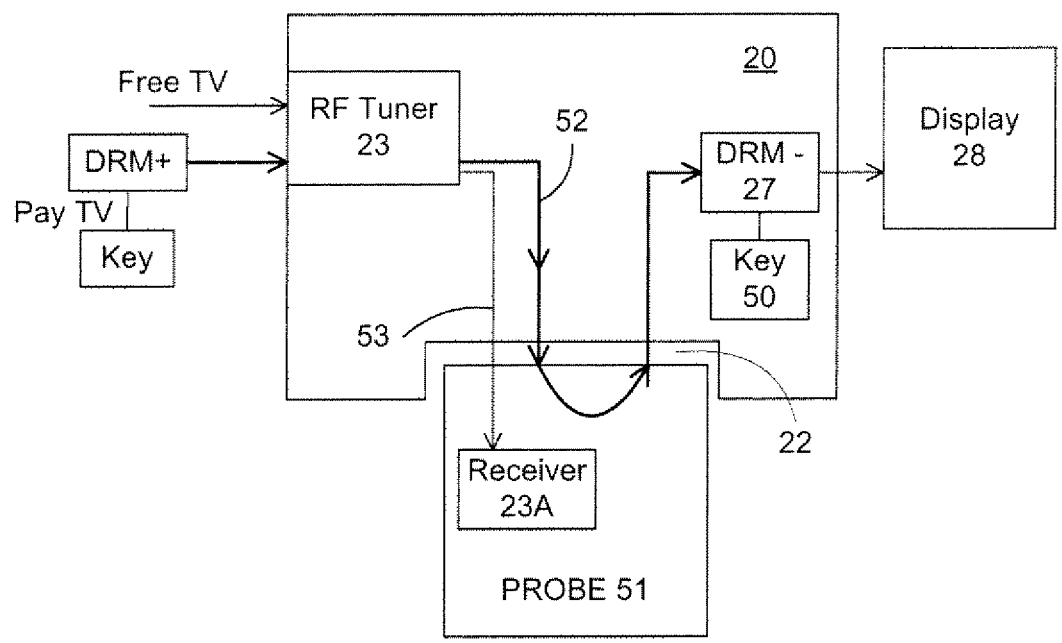
FIG. 4 illustrates an exemplary embodiment of the present process of encrypting the TV content with a DRM encryption through the RF tuner.

FIG. 4 illustrates an exemplary embodiment of the present process of encrypting the TV content with a DRM encryption so that the TV content can pass straight through the probe without any descrambling or re-encrypting. A probe 51 is connected to a TV receiver 20 through a CAM interface 22 of the TV receiver, replacing a standard removable CAM to pass the DRM-encrypted TV content 52 through without any encryption related processing. In this embodiment, the signal from either Free TV (e.g., broadcast TV) or the Pay TV is received at the RF tuner 23 of the TV receiver. The Pay TV content is encrypted with the native or inherent DRM key 50 of the TV receiver, which has been provided to the Pay TV source, for example, during the installation of the probe. The signal received by the TV receiver typically includes an in-band signal at the RF tuner 23, which contains the TV content, and an out-of-band signal at the receiver 23A, which provides the communication between the probe and the TV source. The in-band signal passes through the RF tuner 23, carrying the content 52 to enter the probe 51 and return to the TV receiver 20. The DRM-encrypted TV content is descrambled at the DRM descrambling module 27, using the extracted content key from the key module 50. The descrambled signal is then displayed at the display 28.

The out-of-band signal 53 provides the communication between the TV source and the probe 51. For example, the TV source can bidirectionally communicate with the probe at the communication channel 53, which authorizes the probe to accept a specific set of services. In an aspect, the TV source after having directly paired with each of the authorized TV sets needs to use the established authenticated secure channels to securely deliver the content key used for encrypting the selected channels. In an aspect, if multiple TV sets are tuned to the same channel, the authorization server of the TV source can share the same content key across the authorized TV sets, and in another aspect it can use some unique key per connection for video on demand or other unicast delivered services.

In an embodiment, the present invention provides methods and apparatuses for streaming TV content, such as IP content, to a TV that may not support it. It leverages a probe, which is a removable access module connected to the standard CAM interface, to receive the IP content, and either send the IP content to the CAM interface to the TV receiver, or digitally modulate the IP content to a fixed frequency for the TV receiver's antenna input. The present invention recognizes that the CAM is closely integrated with the standard TV receiver through the CAM interface with specific data transmission sequence, and thus has presented the present probe with special circuitry and software to work with the standard TV receiver. The present invention also recognizes the conditions for the TV receiver to operate with the CAM, and thus discloses methods for streaming TV content to a TV receiver using the probe. For example, in some cases, the present probe provides some forms of TV signals to the antenna input in order to enable the use of the CAM connection.

Support for standardized removable CAMs is mandated by regulatory agencies for TV receivers compatible with North American cable networks and with the satellite, terrestrial and cable TV networks of many European countries. As a result, consumer electronics companies have been required to implement a secure point-to-point content protection algorithm between the module and the TV receiver, to guarantee that compressed digital content remains protected on the user-accessible bus used to connect the CAM to the TV receiver. The present invention can also address different content protection algorithms and interface protocols, for example, the CAM differences used in the US and in Europe. For example, TV receivers can retrieve a table of program information from the RF tuner, and activate the CAM when sending a transport stream containing a selected program from the RF tuner to the CAM for descrambling the selected program. Other TV receivers activate the CAM when receiving a valid RF signal from the RF tuner, and then retrieve the table of program information after the CAM.

In certain cases for a standard TV receiver, the CAM is a stand alone module which may or may not be active during the operation of the TV receiver. For example, the TV receiver may not accept a transport stream from the CAM if it has not originally pushed a transport stream to the CAM. The RF tuner, after detecting a valid RF signal, demodulates it and sends to the CAM interface with instruction commands to descramble a user-selected program within the transport stream. Only then, the TV receiver is conditioned to receive a returned transport stream from the CAM across the CAM interface.

After replacing a standard CAM with the present probe, even though the probe is connected and communicated with the IP source, ready to provide the TV content to the TV receiver, the probe does not know what the user is trying to do. Generally, only after the RF tuner sends a transport stream and instructions to the CAM interface, then the probe is notified about the program that the viewer wants to watch and/or the channel that the TV receiver is trying to tune to. Thus in an embodiment, the present invention discloses providing a synthesized RF signal to the RF tuner of the TV receiver to establish communication between the probe and the TV receiver. After receiving the synthesized RF signal, the TV receiver will send the demodulated synthesized RF signal to the probe, together with instruction commands asking for descrambling a selected program, and puts itself in a position to receive a transport stream from the probe. In the prior art CAM, the selected program is included in the coming transport stream. In the present synthesized RF signal, the selected program might or might not be present. The probe then communicates with the IP source to receive the user-selected program and to forward it to the TV receiver. In one aspect, the received content is added to the synthesized RF signal. In another aspect, it is inserted into the transport stream on the output of the CAM interface. In both cases, the TV received is able to find and decode the channel, which complete the tune operation.

The synthesized RF signal can be a simple valid RF signal, e.g., a dummy RF signal, with the purpose of providing a valid RF signal to the RF tuner to demodulate and send to the CAM interface. The synthesized RF signal can carry additional information for displaying on the display, such as a test or a logo pattern, or just a blank, monochromatic image (e.g., a totally black screen). Alternatively, the synthesized RF signal can carry some additional special characteristics to address the specific TV receiver requirements, depending on the different configurations of the TV receiver. For example, the synthesized RF signal can contain useful information, such as information regarding the available channels.

Figure 5:
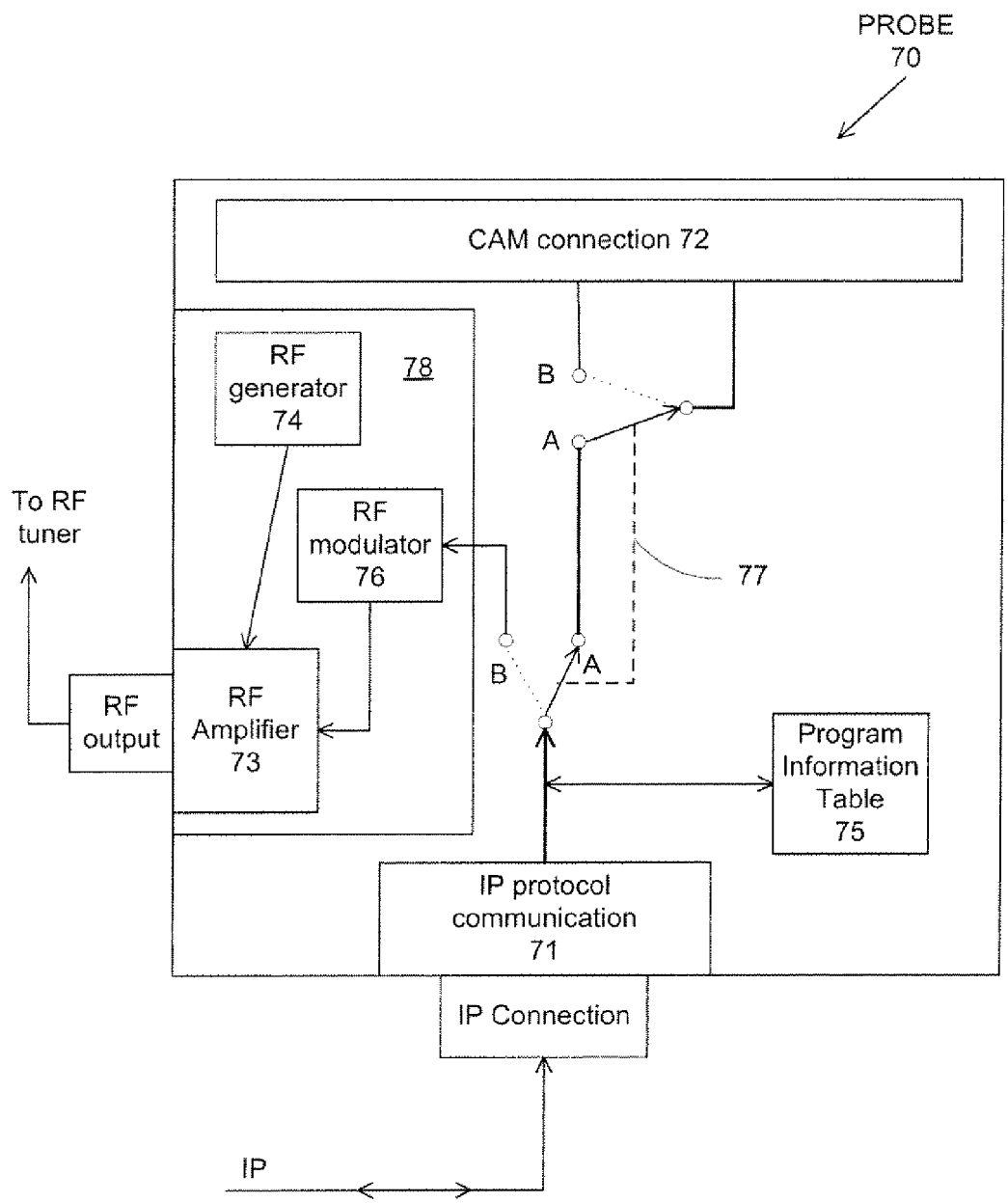
FIG. 5 illustrates an exemplary probe according to an embodiment of the present invention.

FIG. 5 illustrates an exemplary probe 70 according to an embodiment of the present invention. The probe comprises an IP protocol communication module 71 with an IP connection to communicate with an IP source, for example, to allow the delivering of IPTV or other IP content with a two-way communication link between the probe and the IP source. The probe also comprises CAM physical and electrical interface 72 for connecting to a TV receiver at the removable CAM connection. The probe further comprises a RF module 78 having a RF output to provide a RF signal. The RF module 78 can comprise a RF circuitry such as a RF generator 74 to provide the carrier frequency or a valid RF signal, a RF modulator 76 to generate the modulated digital stream and a RF mixer 73, for example, to mix the carrier signal and the modulated signal or to amplify the RF signal. The mentioned RF circuitry of the RF module 78 are exemplary, and not to be construed as a limit of the present probe. Some described RF circuitries can be omitted, and additional circuitries can be included. In an aspect, the RF module 78 is designed to provide a synthesized RF signal to set the TV receiver in a mode where it needs to request the probe to descramble a particular program. The carrier frequency can be fixed to a specific channel, for example, channel 3 or 4. Alternatively, it can be set to any value within the range of the RF tuner of the TV set. The TV set is expected to find the probe RF synthesized signal during its setup sequence, or the probe can directly request the TV set to tune to its frequency if the CAM interface support commands to control the RF tuner. In another aspect, the RF module 78 is designed to accept a transport stream from the IP source and transmit it to the RF output. If required, the RF module 78 can modulate the transport stream to the RF carrier frequency, for example, if the transport stream contains audio/video frequency signal.

In addition, the probe can comprise a memory and process module 75, for example, for storing service information tables to provide information regarding the available IP contents, allowing the display of all available TV channel, permitting the mapping of selected channels to the ones offered by the TV source and allowing the TV receiver to identify the user-selected program within the delivered transport stream. The information in the service information tables can be updated from the IP source. In an aspect, the probe inserts the service information tables into the RF synthesized. In another aspect, the probe inserts the same tables in the transport stream when it comes across the CAM interface 72.

In an embodiment, the probe leverages the man-machine interface resource of the CAM interface to load a navigation application that will present the content that is available from the TV source. Per the transmitted channel map, all the available programs are logically available from the probe RF-synthesized signal, which will trigger the TV set to request the probe to descramble the user selected program. In an aspect, the probe requests the TV source for the user-selected program upon receiving the descrambling command, which will be provided in return to the probe as a normal operation of the IPTV server. The probe then prepares the TV source stream for the TV receiver by removing the CA encryption and applying the proper DRM encryption, if required.

The probe can allow the IP content to reach the TV receiver directly to the CAM interface 72, or insert the IP content into the RF-synthesized signal. Once reaching the RF tuner, the TV circuitry sends the signal back to the probe through the CAM interface, and the probe forwards the signal back to the TV receiver, also by the CAM interface. The probe thus comprises a switching module 77 having two connection positions A and B. In position A, the signal travels from the IP source directly to the CAM interface 72 to reach the TV module. In position B, the signal travels to the RF module 78, modulated to the RF carrier frequency, and sent to the RF tuner of the TV receiver. The RF tuner (not shown) passes the RF signal to a RF demodulator (not shown), before returning the demodulated signal to the probe through the CAM interface. The signal can pass through the probe back to the TV receiver, also through CAM interface.

In an aspect, the TV content from the TV (or IP) source is encrypted with the inherent DRM encryption. The signal is thus can pass through the probe and RF tuner without any decryption and re-encryption process, and still remain protected by the inherent DRM encryption. The DRM-encrypted TV content is descrambled at the DRM descrambler module in the TV receiver before sending to the TV display. Most modern HDTVs include an inherent, built-in DRM system which is designed to protect content up until the point the content is rendered for display.

In an aspect, the TV content can be encrypted with an appropriate encryption, such as a CA encryption, with the probe acting as a bridge to convert the CA encryption to an inherent DRM encryption of the HDTV. The probe thus can comprise a CA-decryption module (not shown) and a DRM-encryption module (not shown) to bridge the TV content from the TV source to the TV receiver. The CA-decryption module and the DRM-encryption module can be positioned anywhere in the signal path.

Figure 6A:
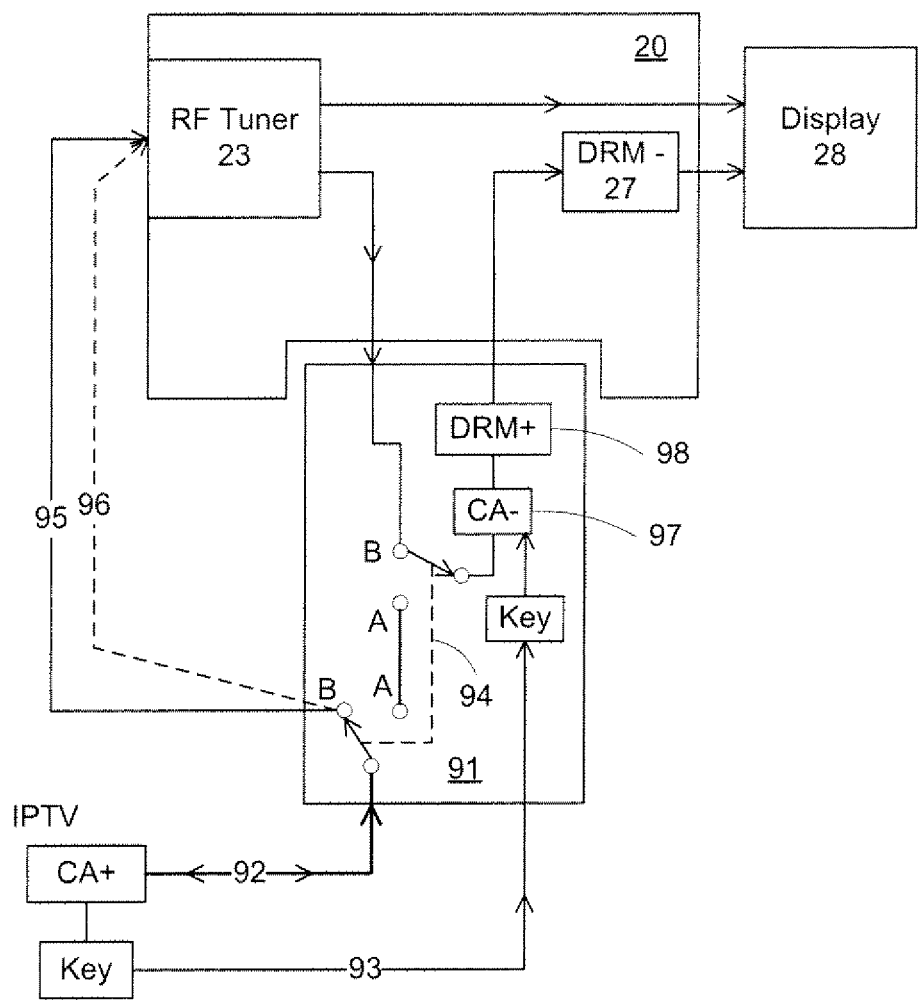
FIG. 6A illustrates an exemplary configuration of a probe to be enabled by the TV receiver.

FIG. 6A illustrates an exemplary method and a configuration of a probe 91 to be enabled by the TV receiver 20. In this configuration, the probe configures the switching module 94 to position B to allow a default TV content 92 from the IP source to be added to the RF synthesized signal, and to allow the RF-demodulated signal from the TV receiver to pass through the probe to the DRM descrambler 27. The probe 91 receives an IP content 92 and content key 93 in a separate secure channel. The probe sends a synthesized RF signal 96 from the RF out to the RF tuner 23 of the TV receiver 20. The RF tuner 23 accepts a valid RF signal (which is the synthesized RF signal) then sends the signal, after demodulation, to the probe. This activates the TV receiver to send a descrambling request to the CAM interface along with the received transport stream. Upon notification, the probe can request the selected program to the TV source and upon reception can insert it into the synthesized RF signal 95. Signal 95 includes the requested program, and signal 96 can be empty or include available program information. Signals 95 and 96 are shown to be separate with different notation to denote the difference in signal content, but are carried in the same physical cable. The requested program can be encrypted, for example, with a CA encryption, and additional decryption (for example, CA decryption 97) and re-encryption (for example, DRM encryption 98) modules can be included in the probe for bridging the protected TV content. The requested program can be encrypted with the native or inherent DRM encryption of the TV receiver, and in this case, the additional decryption 97 and encryption 98 are not needed. The IPTV also communicates with the probe through communication channel 93, for example, to establish the secure channel and exchange keys.

Figure 6B:
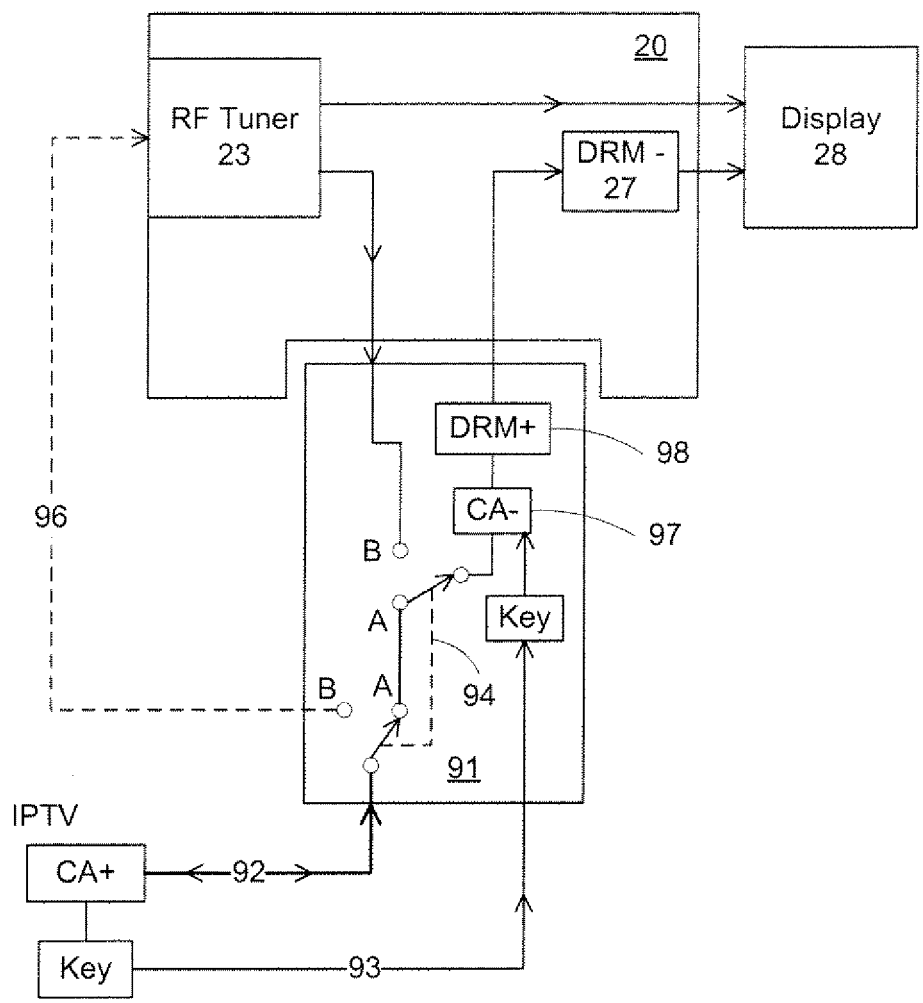
FIG. 6B illustrates another exemplary configuration of a probe to be enabled by the TV receiver.

FIG. 6B illustrates another exemplary method and a configuration of a probe 91 to be enabled by the TV receiver 20. In this configuration, the probe configures the switching module 94 to position A to allow the TV content 92 from the IP source to directly transmit to the DRM descrambler 27. The probe 91 receives an IP content 92 (and content key 93 in a separate secure channel). The probe then sends a synthesized RF signal 96 from the RF output to the RF tuner 23 of the TV receiver 20. The RF tuner 23 accepts a valid RF signal (which is the synthesized RF signal 96) then sends the signal, after demodulation, to the probe. This allows the probe to be told what channel has been selected. The probe now can receive the requested TV content 92 and insert it in the transport stream at the output of the CAM interface before it goes to the DRM descrambler 27 of the TV receiver 20. Also, additional decryption (for example, CA decryption 97) and re-encryption (for example, DRM encryption 98) modules can be included in the probe for bridging the protected TV content, together with a secure communication channel 93 for key exchange. In an aspect, if the synthesized RF signal comprises information of the available channels, which can be supplied from the IP source, the switching module 94 can first turn to position B to allow inserting data from the IP source to the synthesized signal. After the probe receives information about what channel has been selected, the switching module 94 can first turn to position A to allow the insertion of the IP content to the transport stream directly to the CAM interface.

In an embodiment, the present probe acts as a physical and logical bridge between the TV source, such as an IPTV headend, and the TV receiver. For example, the probe connects to the IPTV network as a regular IPTV set-top box, and it plugs into the TV receiver as a regular CAM. In an embodiment, the probe is designed to connect each functional module of the IPTV headend with its matching feature in the TV receiver.

Figure 7:
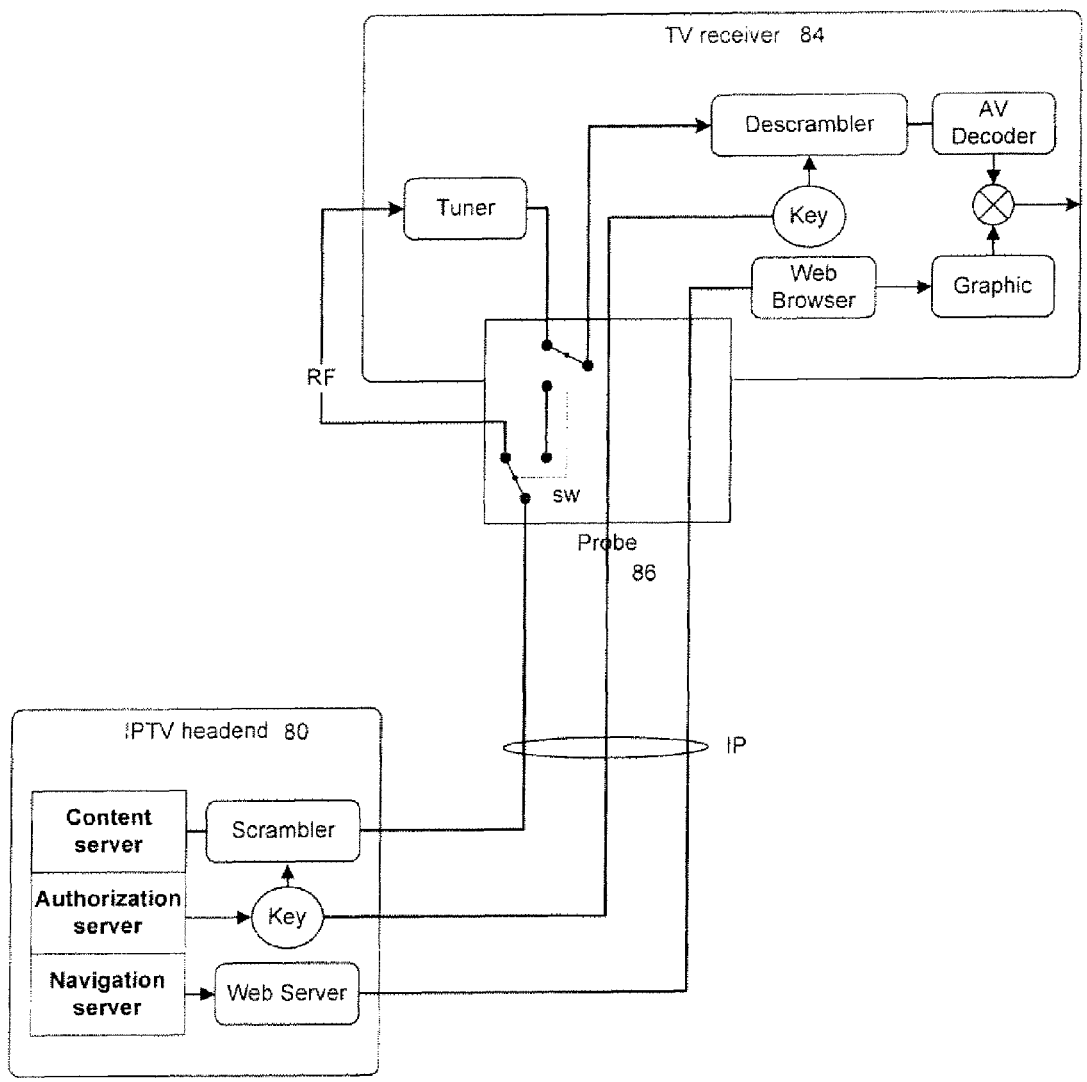
FIG. 7 illustrates a connection schematic with an IP-connected probe between an IPTV headend and the TV receiver.

FIG. 7 illustrates an IP-connected probe 86 between an IPTV headend 80 and the TV receiver 84. The IPTV headend comprises a content server for providing TV content to the TV receiver, an authorization server (for example, a CA server) for providing authorization to the TV receiver for encrypted TV content, and a navigation or catalog server for the TV receiver to navigate the TV content. The content server includes a scrambler module for encrypting protected TV content. The authorization server includes a key module for providing a content key (or descrambling key) to entitle TV receiver for descrambling the encrypted TV content. The navigation server includes a web server for providing information related to the TV content, and for providing the capability of browsing the TV content.

The TV receiver comprises a RF tuner for receiving RF signal, a descrambler for descrambling signal encryption, for example, the inherent DRM encryption of the TV receiver, a key module to provide content key to descramble the TV content, and an AV decoder for decoding the descrambled signal. The TV receiver also comprises a web browser and a graphic module for navigating a web server.

In an embodiment, the probe establishes an IP connection with the navigation server, and it acts as a bridge between the IP network and the browser application within the TV receiver. As a result, the TV receiver can seamlessly navigate a content catalog or grid, for example, composed of html/mpeg pages hosted on the navigation server, without any modification of the TV receiver application software. The IP network can comprise a TV content channel, a secure authorization channel, and a web connection channel. The web connection channel connects the web server of the IPTV headend with the web browser of the TV receiver, using the probe as a middle connection. The secure authorization channel connects the authorization server with the TV receiver, to provide the content key for descrambling the encrypted TV content. The content channel delivers the TV content from the IPTV to the probe that can be RF modulated to transmit to the RF tuner of the TV receiver, or can be directly connected to the descrambler module.

Figure 8:
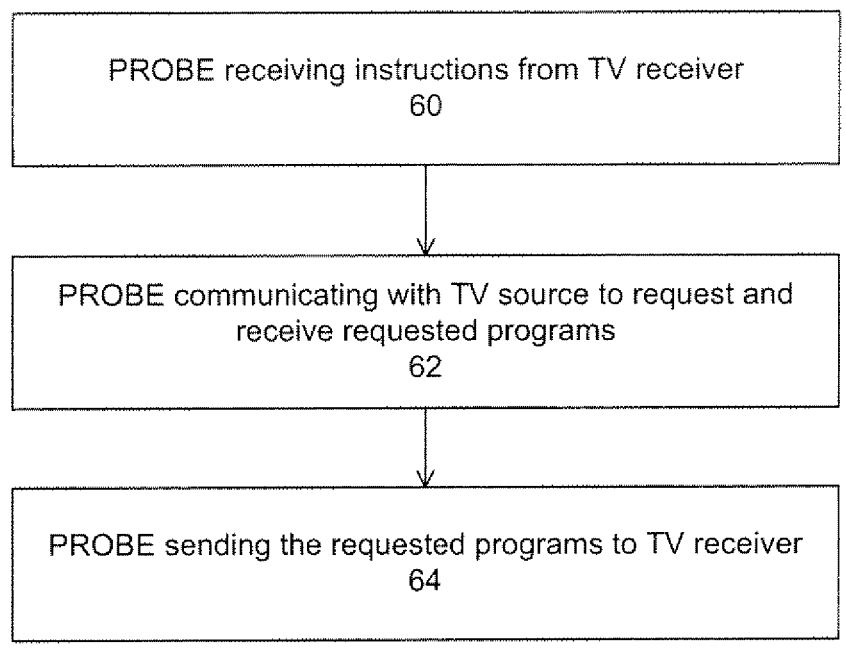
FIG. 8 illustrates an exemplary process of the present invention for streaming a TV content from a probe to the TV receiver.

FIG. 8 illustrates an exemplary process of the present invention for streaming a TV content from a probe to the TV receiver. In operation 60, the probe (such as any one of the probes shown in FIGS. 3A, 4, 5, 6A, 6B and 7) receives instruction commands from the TV receiver regarding the user selected programs. The instructions can be in the form of a command requesting to descramble a particular channel. The commands can be accompanied by a transport stream. The commands can be the result of a synthesized RF signal to the RF tuner from the probe. In operation 62, the probe communicates with the TV source (or IP source) to request and receive the selected channel content. In operation 64, the probe sends the selected channel content to the TV receiver.

Figure 9:
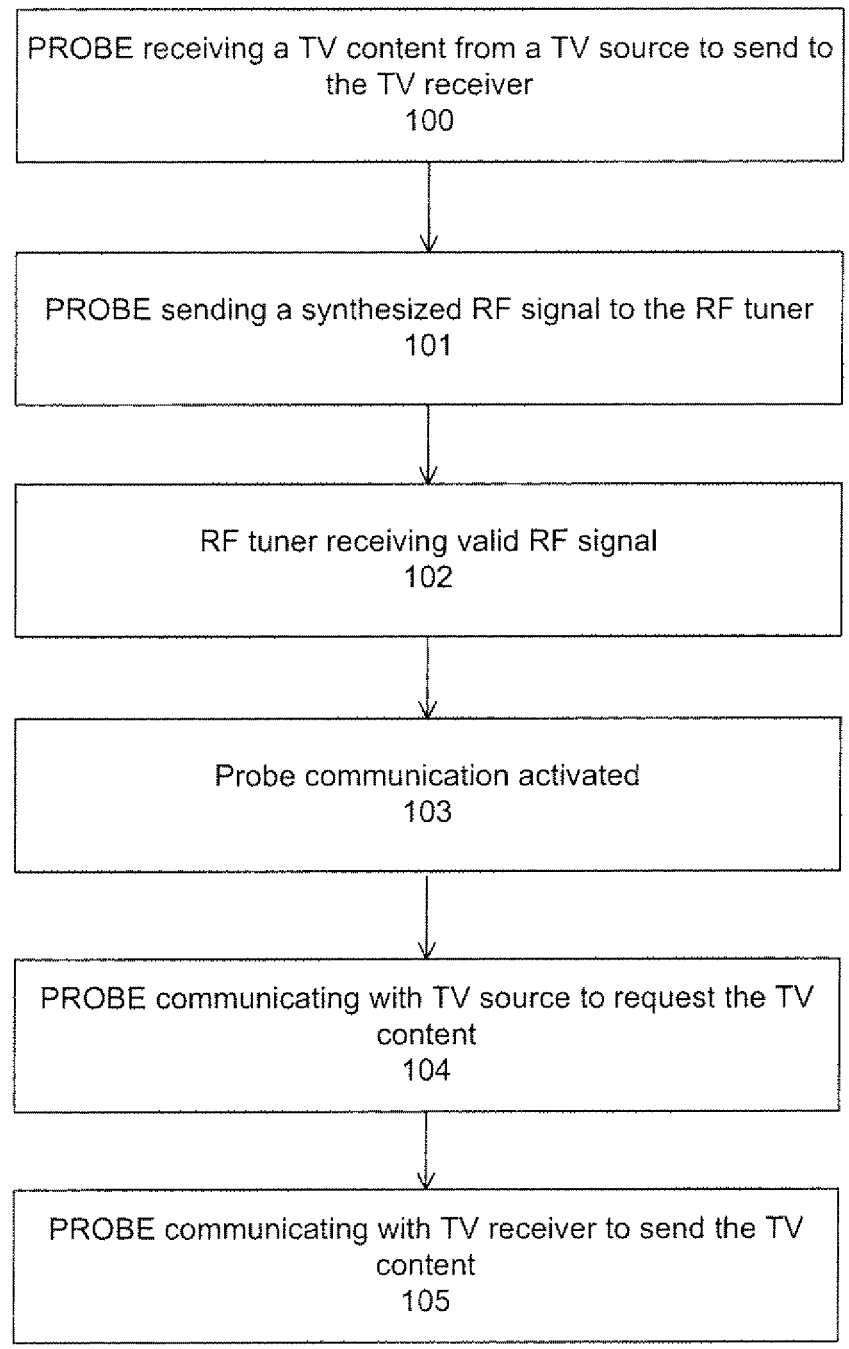
FIG. 9 illustrates another exemplary process of the present invention for streaming a TV content from a probe to the TV receiver.

FIG. 9 illustrates another exemplary process of the present invention for streaming a TV content from a probe (such as any one of the probes shown in FIGS. 3A, 4, 5, 6A, 6B and 7) to the TV receiver. Operation 100 receives a default TV content from a TV source, at the probe, to transmit to the TV receiver. The probe is fully functional after boot, but will not receive commands from the TV to descramble a given program if there is no program received at the TV tuner. Thus, lacking a valid RF signal detected by the RF tuner, the probe does not know what program the TV receiver wants to tune to, so the tune operation cannot be completed. Operation 101 thus sends a synthesized RF signal to the RF tuner of the TV receiver. For example, the probe comprises a RF module to modulate the default stream to a default valid RF signal. Operation 109 provides that the RF tuner receives a valid RF signal, which is the synthesized RF signal transmitted from the probe. The RF tuner can find the RF frequency of the synthesized RF signal during its normal set-up operation or it can be tuned to it by the CAM interface, if the protocol allows for remote control of the tuner (e.g. OpenCable). After the RF tuner receives the valid RF signal, the probe communication is activated (operation 103). For example, the TV receiver can demodulate the synthesized RF signal, and send instructions to the CAM interface to descramble a selected program within the transport stream. The TV receiver is then ready to accept a return transport stream from the probe. This probe in turn can request the selected program or channel to the TV source using the TV source navigation protocol (operation 104) and upon reception of the said selected channel, add it to the transport stream forwarded to the TV receiver (operation 105). For example, the probe can add the selected channel in the RF-synthesized signal or in the transport stream output of the CAM interface.

In an embodiment, the present invention covers the specifics of content navigation without requiring any modification of the TV receiver application software or provisioning of IPTV-specific software. In an aspect, the present content navigation is achieved by supporting a catalog/grid browsing session on the TV receiver and enabling a flat multiplex navigation. In an embodiment, a flat multiplex is a virtual MPEG multiplex that contains the definition of all available programs but includes a single audio and video components that is dynamically switched to carry the selected program. One advantage of the present flat multiplex is that it allows the probe to modulate at a fixed single frequency (for example, channel 3) and it allows the probe to uniquely identify the user-selected program on the CAM interface (for example, by MPEG program number only) so that it can request it from the content server.

FIG. 10 illustrates a prior art channel map containing multiple channels, for example, 1 to n+2. Channels are grouped per carrier RF frequency. For example, in prior art MPEG2 networks, the Network Information Table (NIT) and the Service Description Table (SDT) are used to describe multiple transport streams, carried over multiple RF channels. Each transport stream carries multiple elementary program streams, for example, program 1, 2, 3, etc. In prior art MPEG2 networks, information regarding the multiple elementary program streams that are carried simultaneously in a single transport stream is tabulated in the Program Association Table (PAT) and the Program Map Table (PMT). Each program stream also has different audio and video components. Each channel is identified by frequency, program number and audio/video PID. For example, to select channel 4, the RF tuner is tuned to frequency 2, the instruction command is sent to request descramble program 1 of the transport stream, and the audio video PID is set to 10/11.

Figure 11:
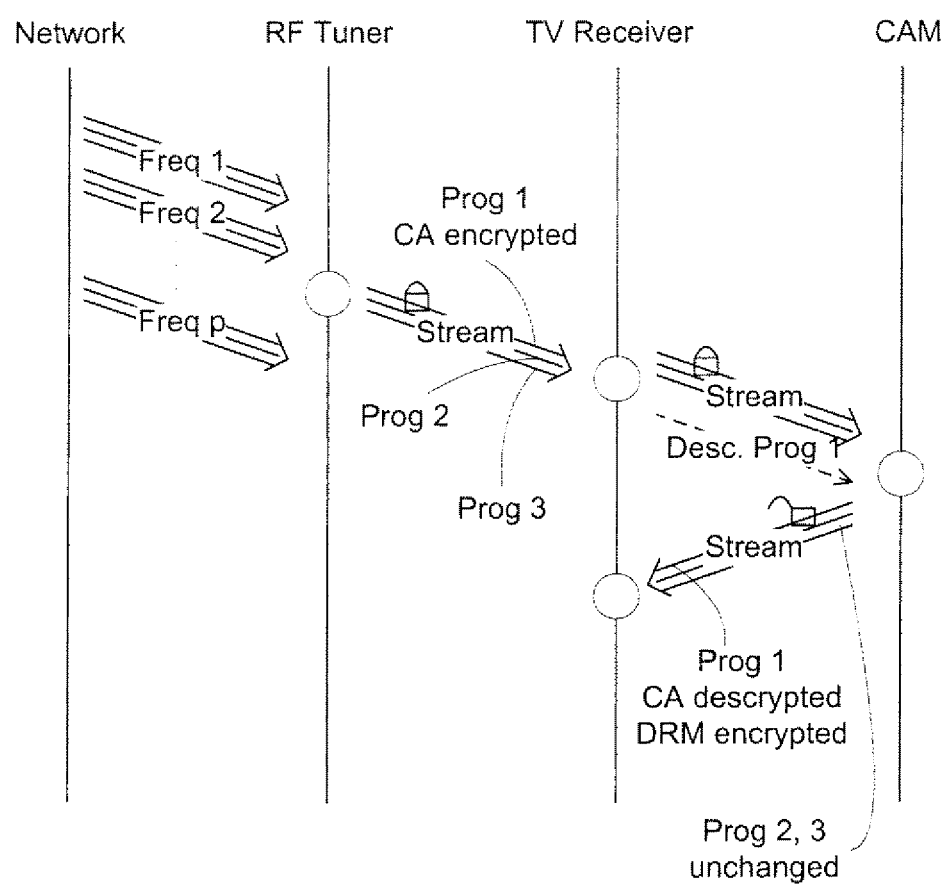
FIG. 11 illustrates a prior art MPEG2 network.

FIG. 11 illustrates a prior art MPEG2 network, where multiple channels at different RF frequencies are sent to the TV tuner of a TV receiver. Once the TV receiver is asked to tune to a particular channel, for example channel 4, the TV tuner is tuned to a frequency that carries channel 4, for example, frequency 2, allowing the associated transport stream to be released by the RF tuner. The transport stream of channel 4, which carries simultaneously multiple elementary program streams, for example, program number 1, 2 and 3, is then sent to the CAM, together with the instruction to descramble program number 1. The CAM descrambles program number 1 and re-scrambles it using the inherent DRM system of the TV receiver, all other programs are passed through untouched.

The present Flat Multiplex is distinguished from the prior art, and can contain significant improvements. FIG. 12 illustrates an exemplary channel map for the present Flat Multiplex, showing that all channels are sharing the same frequency and same audio/video components. Also, the program number is the same as the channel. In an aspect, the present Flat Multiplex essentially flatten the program streams, so that the MPEG program number can be the only distinguished feature of a channel. For example, to select channel 4, the probe requests program 4 from the flat multiplex. In an aspect, the system information data are streamed from the TV source to each probe, for example, using standard or other prior art IPTV protocols. Once the probe receives the program number among the Flat Multiplex that needs to be descrambled, it can uniquely order it to the TV source, and dynamically insert it in place of the default audio and video components.

Figure 13:
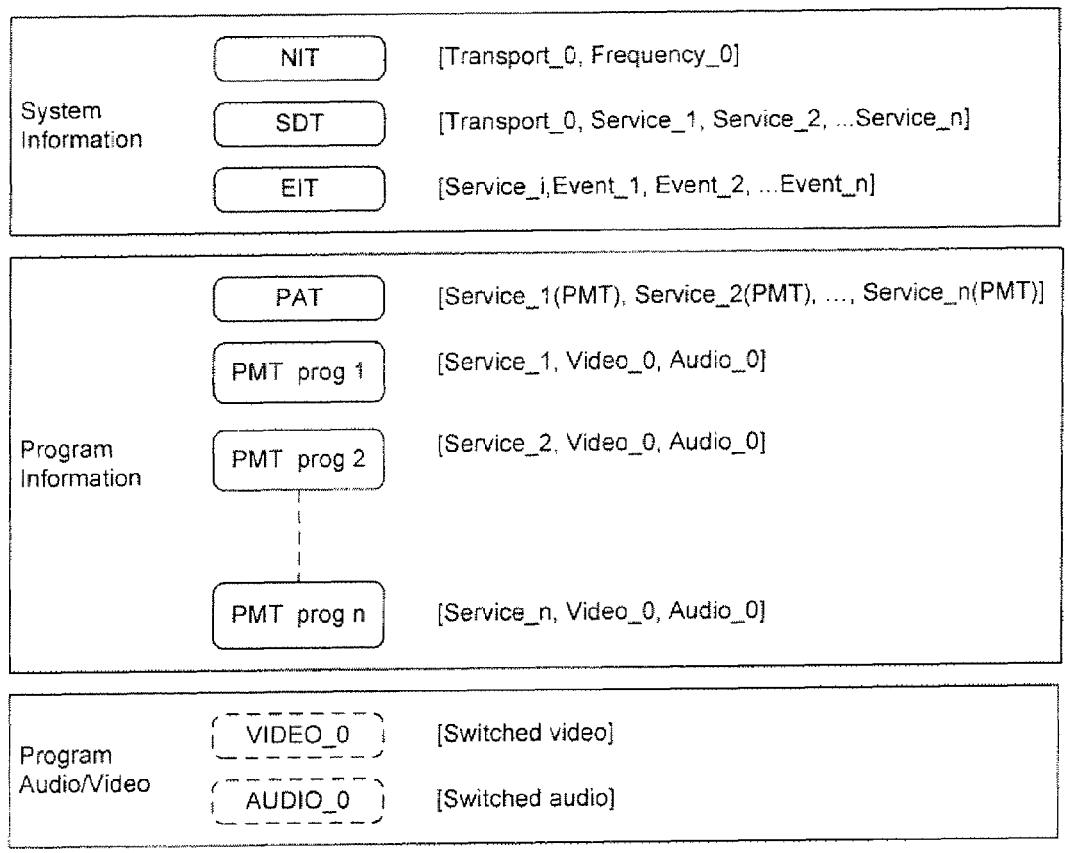
FIG. 13 illustrates an exemplary construction of the present Flat Multiplex.

In an embodiment, the Flat Multiplex is a transport stream, such as a MPEG2-compliant transport stream, that includes virtually all the available channels of the TV source, but physically only carries the audio and video components of the user-requested program. As shown in FIG. 13, in the Flat Multiplex system information table which includes the reference tables for building a channel map, the Network Information Table (NIT) and the Service Description Table (SDT) describes a single transport stream on a fixed frequency for all the services of the network, such as programs or channels. In addition, in the Flat Multiplex program information table which includes the reference tables for identifying audio and video components, the Program Association Table (PAT) enumerates the Program Map Table (PMT) of all the virtual channels that can be delivered, with each PMT points to the same reference audio and video component. For multiple RF tuners feeding the same probe, the Flat Multiplex can be generated with one elementary program per tuner.

Based on the capacity of the TV receiver, the Flat Multiplex transport stream is either injected in the TV receiver through the RF input, leveraging a built-in RF modulator of the probe, or it is delivered to the TV receiver directly on the CAM interface.

Figure 14:
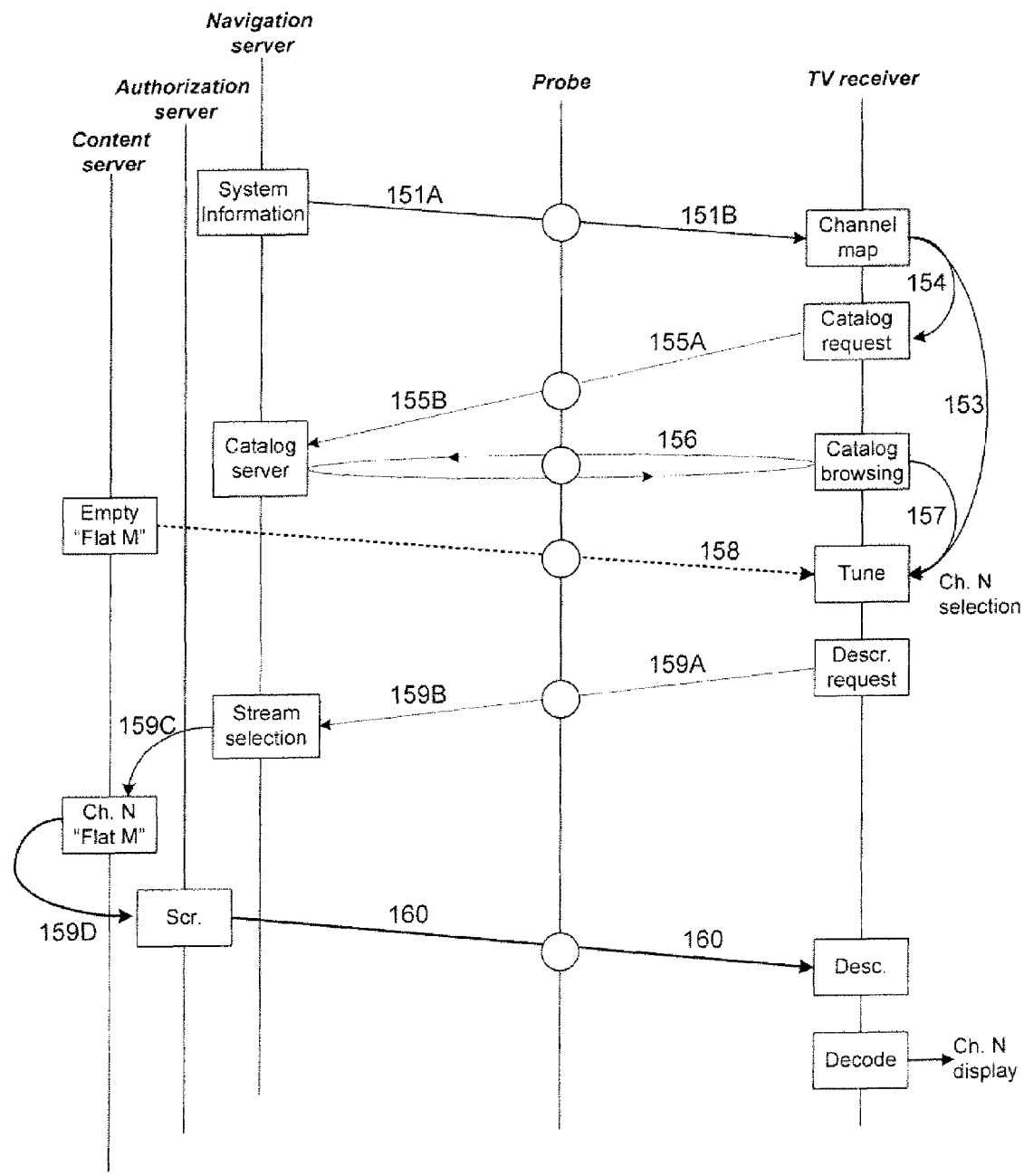
FIG. 14 illustrates an exemplary tuning sequence operation of selecting a channel according to an embodiment of the present invention.

FIG. 14 illustrates an exemplary tuning sequence operation of selecting a channel according to an embodiment of the present invention.

1. The TV receiver builds its channel map based on the system information tables provided by the Navigation server. The probe communicates 151A with the navigation server of the IPTV network, for example, and receives system information, such as information on the available channels. The probe then delivers 151B the system information data to the TV receiver. Depending on the CAM protocol the system information data can be partially delivered out-of-band and partially in-band, included into the probe synthesized signal; or completely in-band. For example, some data can be transmitted across the CAM interface using the control interface (out-of-band). Some or all data can be included in the transport stream (in-band) to be sent from the probe to the TV receiver, either through the RF tuner or through the CAM interface.

2. The user can enter 153 a channel number directly by channel number using the TV receiver interface. For example, the user can select channel N. Alternatively the user can request 154 a content catalog menu, in order to select a channel. The request goes 155A to the probe, which passes 155B to a Catalog server of the Navigation server. The user can browse 156 the catalog, and select 157 a channel, for example channel N. The Navigation server can serve one or more content catalog pages.

3. In any case the TV receiver always tunes 158 to the single frequency that includes the network "Flat multiplex", which at this stage is empty of any video and audio component. As shown, the empty flat multiplex is sent from the content server, but it can be sent from the probe.

4. The TV receiver requests 159A the probe to descramble the selected MPEG program number. Because all programs have been flattened into a single multiplex, this information is sufficient for the probe to uniquely identify the requested channel. The probe requests 159B the Navigation Server, and the Navigation server requests 159C the Content server to stream the requested audio and video component. Alternatively, if the current program is already being transmitted by the content server (as an example because another TV receiver in a household has already requested it), then the probe is told to join an existing multicast feed (not shown).

5. The Content server requests 159D the Authorization server to scramble the program before sending to the TV receiver. The Authorization server is responsible for transferring the scrambling key to the TV receiver using the secure authenticated channel created with the protection system of the removable conditional access interface. The network thus sends 160 the scrambled content and the scrambling key to the TV receiver.

6. Once descrambled and decoded, the program is presented to the user.

Depending on the implementation, the probe can have the basic role of a physical and logical bridge or be more involved in the local generation of the Flat Multiplex.

In an aspect, the probe establishes a two-way communication with the TV source, for example, to send program request and to receive the program streaming. The two-way communication can also provide interactive communication between the TV receiver and the TV source. The information that the probe needs to control the TV source can originate from the TV receiver. For example, the information related to the user-requested program can be included in the instruction that the TV receiver sends to the probe asking for descrambling the user-selected program.

Figure 15:
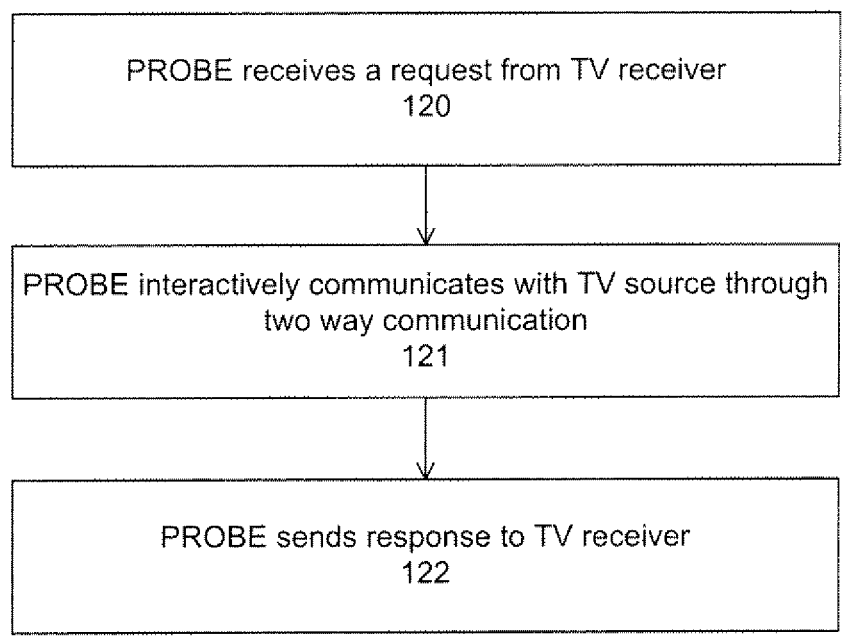
FIG. 15 illustrates an exemplary process of two way communication between a TV receiver and an IP source through an embodiment of the present probe.

FIG. 15 illustrates an exemplary process of two way communication between a TV receiver and an IP source through the present probe. In operation 120, the probe receives a request from the TV receiver. In operation 121, the probe interactively communicates with the IP source through a two way communication to receive a response to the request. In operation 122, the probe sends the response to the TV receiver.

Figure 16:
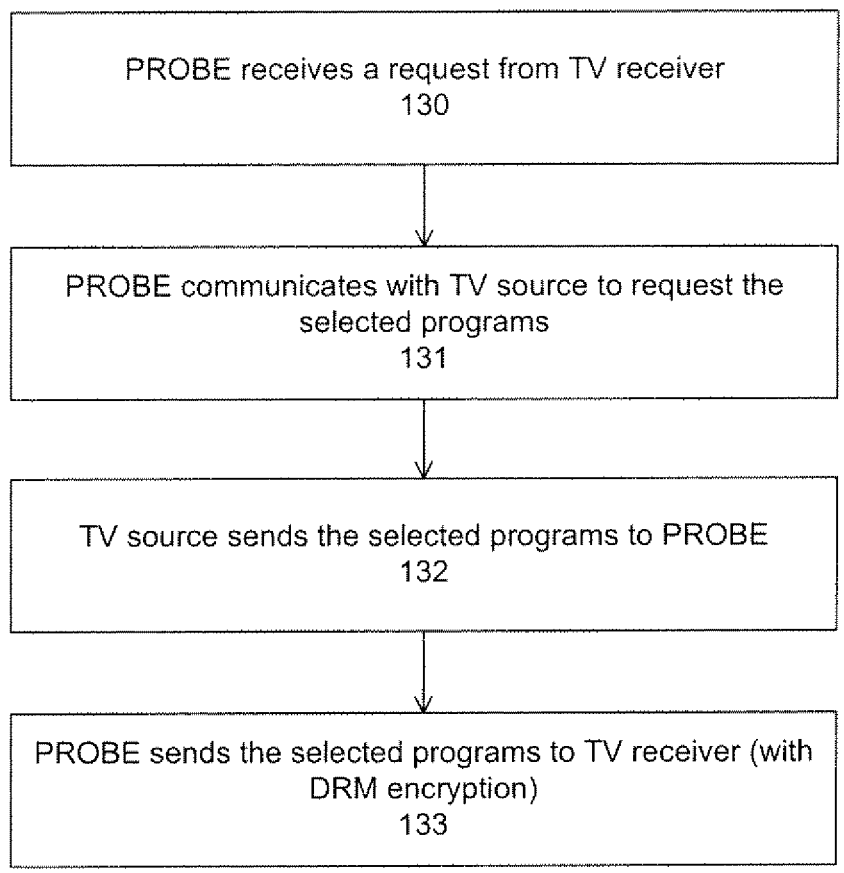
FIG. 16 illustrates an exemplary process utilizing the present Flat Multiplex.

FIG. 16 illustrates an exemplary process utilizing the present Flat Multiplex. Operation 130 provides that a probe receives a request, for example, a request for a user selected program, from the TV receiver. The request can be in the form of an instruction command to descramble a particular program, sent in response to a valid RF signal received at the RF tuner. In operation 131, the probe communicates with a TV source to request the selected program. The TV source could be an IPTV source, connecting to the probe using IP protocols to deliver IP content. Operation 132 provides that the TV source sends the requested program, to the probe. In an aspect, the program is encrypted, for example, with a CA encryption or a DRM encryption at the TV source. Operation

133 provides that the probe extracts the data and put them in the flat multiplex. For example, the probe can descramble the program content and re-encrypted with the inherent DRM encryption of the TV receiver before sending to the TV receiver. Alternatively, the program is encrypted with the inherent DRM encryption at the TV source, and thus the probe can send the program directly to the TV receiver without any descrambling and re-encryption processes.

Figure 17:
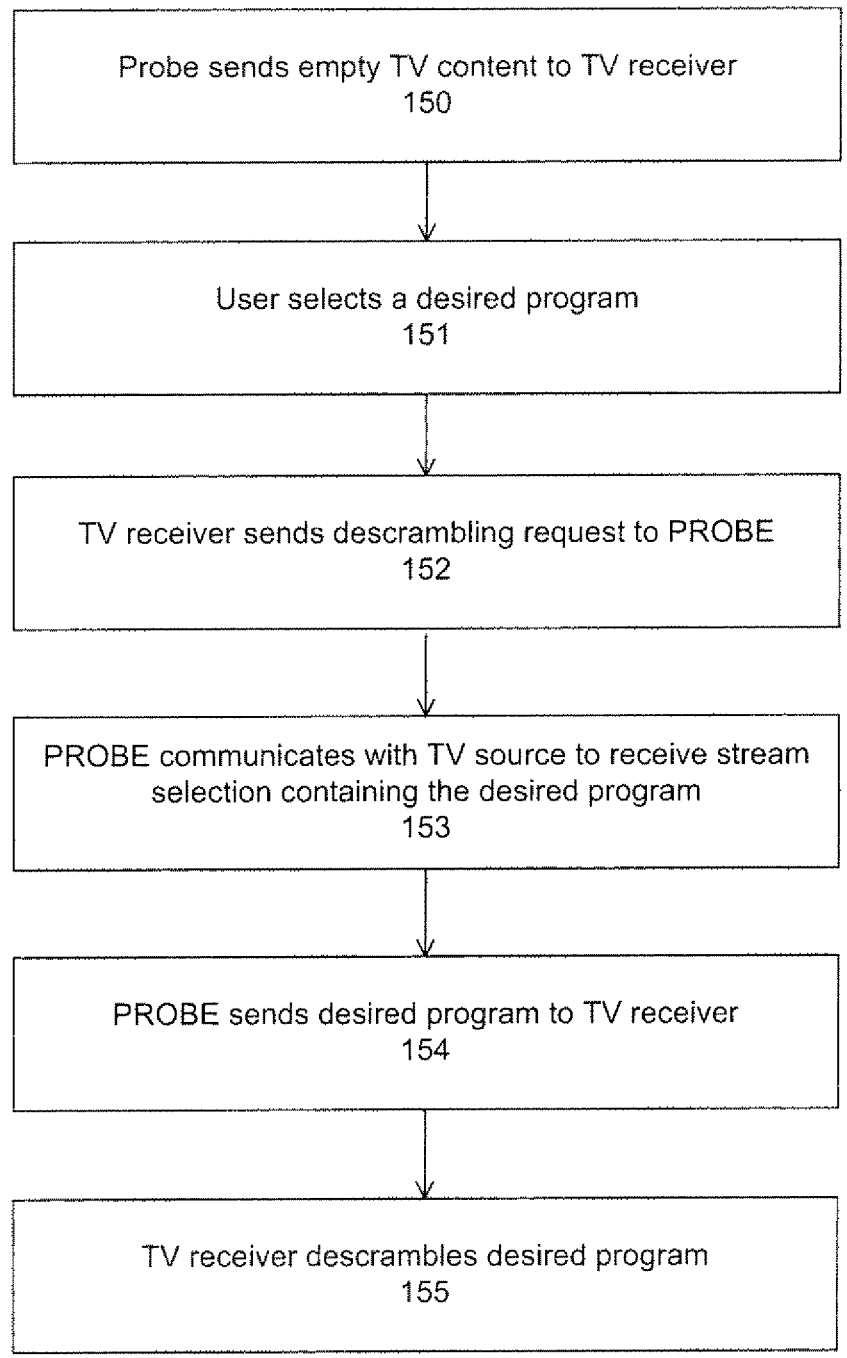
FIG. 17 illustrates an exemplary process utilizing the present Flat Multiplex for the standard TV receiver.

FIG. 17 illustrates an exemplary process utilizing the present Flat Multiplex for the standard TV receiver. In an embodiment, the TV receiver does not request the removable device (e.g., the prior art CAM or the present probe) to descramble any program until it receives a well formed RF signal. The present process thus put the TV receiver in a mode where the probe receives a descrambling request for a given program number. The present invention discloses a RF module in the probe to lock the RF tuner of the TV receiver on a default transport stream. Operation 150 provides that the probe or the TV source, through the probe, sends a default transport stream to the TV receiver through the RF tuner. The default transport stream can contain channel map information, which can come from the TV source or have been stored on the probe. The channel map information describes a Flat Multiplex, with signaling for all the available programs. As a flat multiplex, all program frequencies and audio/video components are identical, the differentiation being made just based on the MPEG program numbers. Operation 151 provides that the user selects a desired program, either from the channel map or from browsing a content catalog, and the TV receiver can direct the transport stream from the RF tuner to the probe through the CAM interface, together with the instruction to descramble the chosen program (operation 152). The probe then communicates with the TV source to receive the audio and video components of the chosen TV program (operation 153). The probe then adds the chosen program components into the flat multiplex transport stream (operation 154). Then, the selected program is extracted from the flat multiplex and descrambled by the TV receiver (operation 155).

Figure 18:
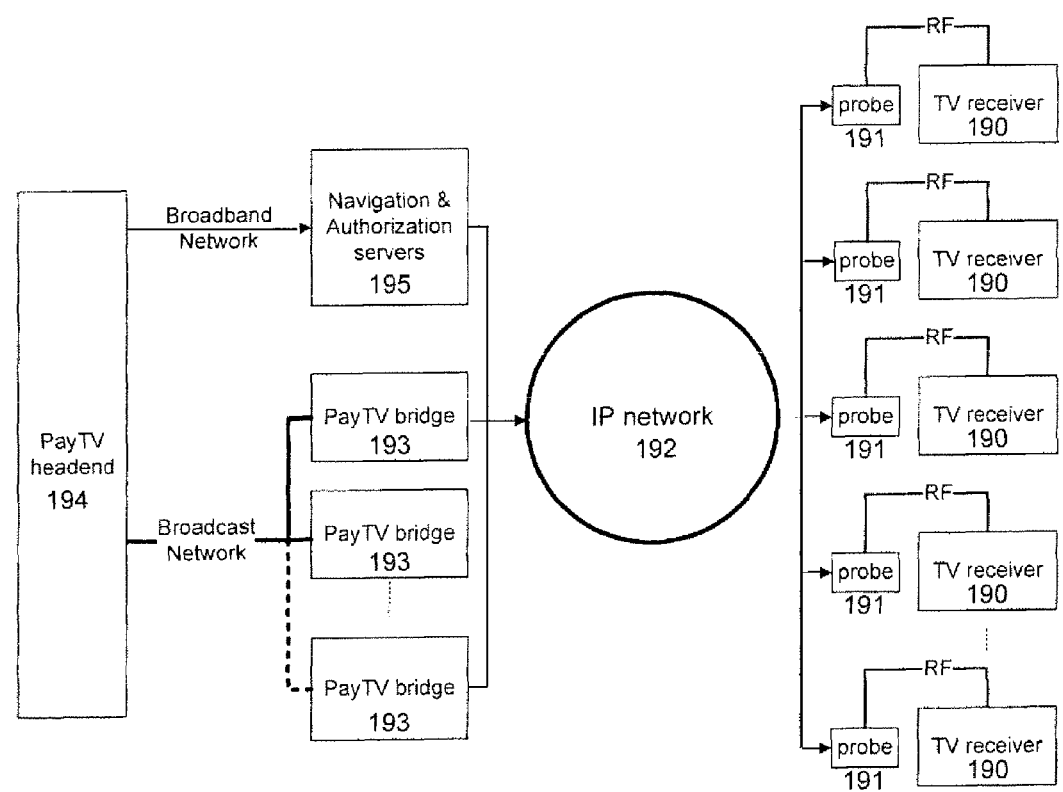
FIG. 18 illustrates an exemplary embodiment describing a specific IPTV headend optimized for hospitality.
Figure 19:
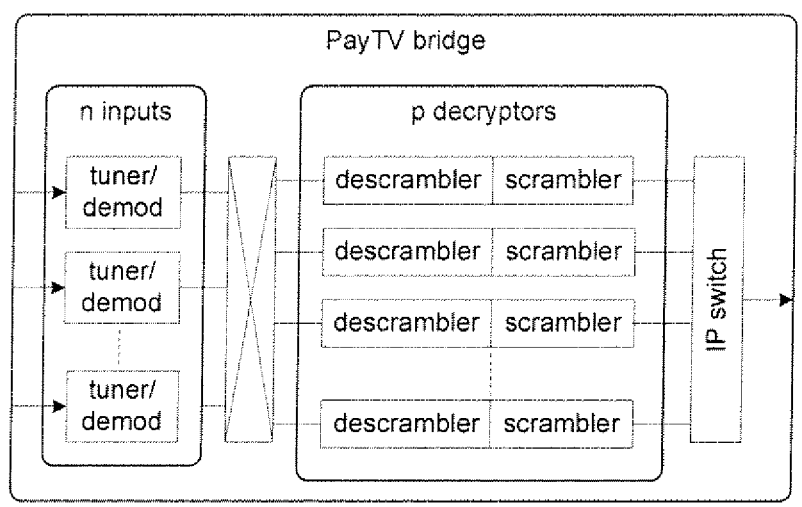
FIG. 19 illustrates an exemplary PayTV bridge.

In an embodiment, the present direct IPTV distribution can be applied in the hospitality market (e.g. for TVs in hotels, etc.). An exemplary embodiment describing a specific IPTV headend optimized for hospitality is shown in FIG. 18. A plurality of TV set with standard TV receivers 190 and the present probes 191 are connected to an IP network 192. The system further comprises a plurality of PayTV bridges 193 that are connected to the IP network 192 to deliver a TV content, received from a remote PayTV headend 194 through, for example, a broadcast network. FIG. 19 illustrates an exemplary PayTV bridge, comprising a stackable hardware module capable of descrambling P programs extracted from N tuners, and to re-scramble them before streaming over IP. In addition, the system comprises a plurality of navigation and authorization servers 195, connected to the IP network 192 to manage all sessions with the TV receivers 190, both in term of navigation and security. The navigation and authorization servers can be connected to a PayTV headend through, for example, a broadband network to communicate with a PayTV server with regard to channel and payment information.

When a program has been selected, the server activates one PayTV bridge, and asks the probe of the TV receiver to subscribe to its multicast feed. The PayTV bridge sets the program content key and securely forward it to the Navigation server. The Authorization server then is responsible to share the content key to all authorized TV sets.

In an aspect, with regard to the operation of the TV receiver, after the probe is initialized, it leverages the man-machine interface capabilities of the CAM interface to establish a silent user session with a catalog server (e.g., the navigation server). This session listens to an agreed remote control key to be pressed by the user. Upon activation, the navigation server starts serving html pages that have been optimized to the browser of the TV receiver as defined by the CAM interface protocol. The purpose of this browsing experience is to review all the details about the current and future programs in order to make a selection. For example, if the user requests channel 0, the user is presented with a program grid overlaid on the current video. The grid is built with XML data received from the navigation server. After channel selection, the video is switched by the probe to the new program and the overlay disappears. If the user requests Details, the user is presented with a bottom banner that includes current program details as received from the navigation server. The banner fades out after 3 seconds. If the user presses the left or right arrow keys while in Details mode, the bottom banner provides information about either the previous or next program on the same channel. In addition, there can be included provision for installation, subscription messages, and any of the PVR functionalities.

In an aspect, with regard to the security, after the probe is initialized, the Authorization server pairs with the matching TV bridge, as long as its credentials have been previously registered and establish a permanent and independent secure authenticated channel. At any time, the Authorization server can instruct the PayTV bridges to re-scramble a channel with a given key and shares securely that key to all subscribing probes.

In an embodiment, the present invention discloses another exemplary application for enabling IPTV services to the home without using legacy PVRs. The provisioning of these equipments can be expensive, but fully profitable as long as the subscriber is buying a large amount of programming and services. However, a low-ARPU subscriber tier, which wants minimal services, doesn't justify the provisioning of a PVR.

By limiting the operator home device to the probe, the invention redefines the minimum provisioning effort for quality access to live and on-demand IPTV television. In this scenario, the IPTV headend is usually in full operation and cannot be upgraded easily, the invention allows for the probe to provide additional bridging support in the area of conditional access (i.e. the IPTV encryption maybe different than the TV receiver decryption, thus a security bridge is implemented in the probe), and navigation. In terms of a user scenario, the user interface can include additional diagnostics and error messages related to the subscription together with other provisions similar to the hospitality application.

Thus the present invention can leverage the web browser the CAM content protection protocol, and the RF navigation capabilities of a standard TV receiver, to fully support IPTV service access without the help of a set-top box and without the need to implement any modification to the TV receiver hardware or software. Both small scale (for example, Hotels) and large scale IPTV deployments (for example, Telco operators) can directly benefit from the invention to reduce the cost of subscriber acquisition and operation. In exemplary embodiments, the invention description covers the case of the hospitality markets, where small networks of a few hundreds of clients can be easily served with the navigation experience and the content services of any PayTV operator by deploying a few stackable PayTV bridges, and a local computer acting as a catalog and CA server.

Figure 20:
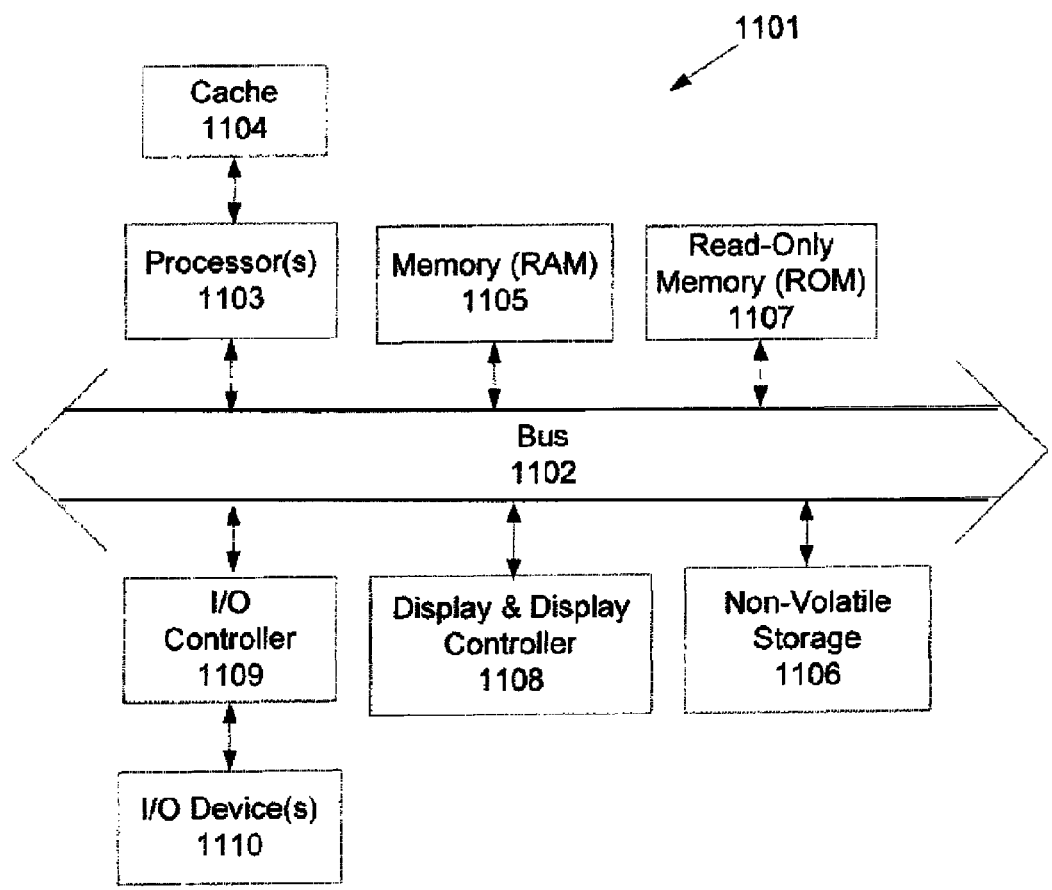
FIG. 20 shows a block diagram example of a data processing system which may be used with the present invention.

FIG. 20 shows one example of a typical computer system which may be used with the present invention. Note that while FIG. 20 illustrates various components of a computer system, it is not intended to represent any particular architecture or manner of interconnecting the components as such details are not germane to the present invention. It will also be appreciated that network computers and other data processing systems which have fewer or more components may also be used with the present invention. The computer system of FIG. 20 may, for example, be a Sun workstation, or a personal computer (PC) running a Windows operating system, or an Apple Macintosh computer.

As shown in FIG. 20, the computer system 1101, which is a form of a data processing system, includes a bus 1102 and system core logic 1112 which interconnect a microprocessor 1103, a ROM 1107, and volatile RAM 1105 and a non-volatile memory 1106. The microprocessor 1103, which may be, for example, a G3 or G4 or G5 microprocessor from Motorola, Inc. or IBM is coupled to cache memory 104 as shown in the example of FIG. 20. The bus 1102 and system core logic 1112 interconnect these various components together and also interconnects these components 1103, 1107, 1105, and 1106 to a display controller and display device 1108 and to peripheral devices such as input output (I/O) devices which may be mice, keyboards, modems, network interfaces, printers, scanners, video cameras and other devices which are well known in the art. Typically, the input/output devices 1110 are coupled to the system through input/output controllers 1109. The volatile RAM 1105 is typically implemented as dynamic RAM (DRAM) which requires power continually in order to refresh or maintain the data in the memory. The non-volatile memory 1106 is typically a magnetic hard drive, a magnetic optical drive, or an optical drive (e.g., a DVD RAM), or other type of memory system which maintains data even after power is removed from the system. Typically, the non-volatile memory will also be a random access memory although this is not required. While FIG. 20 shows that the non-volatile memory is a local device coupled directly to the rest of the components in the data processing system, it will be appreciated that the present invention may utilize a non-volatile memory which is remote from the system, such as a network storage device that is coupled to the data processing system through a network interface such as a modem or Ethernet interface. The bus 1102 may include one or more buses connected to one another through various bridges, controllers and/or adapters as is well known in the art. In one embodiment the I/O controller 1109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 1107, volatile RAM 1105, non-volatile memory 1106, cache 1104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 1103.

A machine readable medium can be used to store software and data which when executed by a data processing system causes the system to perform various methods of the present invention. This executable software and data may be stored in various places including for example ROM 1107, volatile RAM 1105, non-volatile memory 1106 and/or cache 1104 as shown in FIG. 20. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM), random access memory (RAM), magnetic disk storage media, optical storage media, flash memory devices, etc.), as well as electrical, optical, acoustical or other forms of propagated signals (e.g., carrier waves, infrared signals, digital signals, etc.), etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to transmit from a TV source, a TV content to a TV receiver using a probe that connects into a Conditional Access Module (CAM) interface of the TV receiver, wherein the transfer of TV content from the probe back to the TV receiver is protected by a Digital Rights Management (DRM) system of the CAM interface; the method comprising:
    encrypting the TV content ahead of the probe with the DRM of the CAM interface, using a DRM session key;
    transmitting the encrypted TV content to the probe, wherein the encrypted TV content is sent from the probe through the CAM interface to the TV receiver without changing the Digital Rights Management encryption;
    securely delivering the DRM session key from the TV source to the probe using a private key exchange protocol; and
    securely delivering the DRM session key from the probe to the TV receiver using the CAM interface DRM key exchange protocol.

2. A method as in claim 1 wherein the DRM session key of a broadcast channel is shared with all TVs connected to the same channel.

3. A method as in claim 1 wherein the DRM session key of a on demand channel is unique to one TV.

4. A method as in claim 1 wherein the TV content is sent from a TV source directly to the probe.

5. A method as in claim 4 further comprising forwarding the TV content, from the probe, to a RF tuner of the TV receiver.

6. A method as in claim 1 wherein transmitting the TV content to the probe comprises
    sending the TV content to a RF tuner of the TV receiver; wherein the TV receiver in turn sends the TV content to the probe per the CAM interface requirements.

7. A method as in claim 6 further comprising
    passing the TV content through the probe without decryption nor encryption processing.

8. A method as in claim 1, wherein the private key exchange protocol is equivalent to the CAM interface DRM key exchange protocol and the TV source is directly exchanging the DRM session key with the TV receiver.

* * * * *